United States Patent
Kozaki

(10) Patent No.: US 10,619,669 B2
(45) Date of Patent: Apr. 14, 2020

(54) MAGNETIC BEARING CONTROL DEVICE AND VACUUM PUMP

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 296 days.

(21) Appl. No.: 15/716,766

(22) Filed: Sep. 27, 2017

(65) Prior Publication Data

US 2018/0216665 A1 Aug. 2, 2018

(30) Foreign Application Priority Data

Feb. 1, 2017 (JP) ................................. 2017-016837

(51) Int. Cl.
*H01H 47/00* (2006.01)
*F16C 32/04* (2006.01)
*F04D 29/058* (2006.01)
*F04D 19/04* (2006.01)

(52) U.S. Cl.
CPC ...... *F16C 32/0457* (2013.01); *F16C 32/0446* (2013.01); *F04D 19/042* (2013.01); *F04D 19/048* (2013.01); *F04D 29/058* (2013.01); *F16C 32/0489* (2013.01); *F16C 2360/45* (2013.01)

(58) Field of Classification Search
None
See application file for complete search history.

(56) References Cited

U.S. PATENT DOCUMENTS

| 5,300,841 A * | 4/1994 | Preston ............... F16C 32/0448 310/90.5 |
| 9,624,974 B2 | 4/2017 | Kozaki et al. |
| 9,657,774 B2 * | 5/2017 | Kozaki ............... F16C 32/0489 |
| 2015/0300407 A1 * | 10/2015 | Cossart .................. H02P 23/26 310/90.5 |

FOREIGN PATENT DOCUMENTS

| CN | 103728883 A | 4/2014 |
| EP | 2251796 A2 | 11/2010 |
| JP | 2013030180 A | 2/2013 |
| JP | 2014-137116 | 7/2014 |

OTHER PUBLICATIONS

Chinese Office Action, Application No. 201710756833.4, dated Jul. 17, 2019.

* cited by examiner

*Primary Examiner* — Stephen W Jackson
(74) *Attorney, Agent, or Firm* — Renner, Otto, Boisselle & Sklar, LLP

(57) ABSTRACT

A magnetic bearing control device is configured to detect, by a sensor, excitation current supplied from an excitation amplifier to a magnetic bearing configured to magnetically levitate a rotor, thereby generating a voltage equivalent signal for PWM control of the excitation amplifier based on a current setting signal based on a deviation of a rotor levitation position with respect to a target levitation position and an excitation current detection signal of the sensor. The voltage equivalent signal is generated based on the current setting signal and a current deviation signal as a difference between the current setting signal and the excitation current detection signal.

10 Claims, 13 Drawing Sheets

Fig. 6A EXCITATION CURRENT

Fig. 6B APPLIED VOLTAGE

MAGNETIC BEARING CONTROL DEVICE AND VACUUM PUMP

BACKGROUND OF THE INVENTION

1. Technical Field

The present invention relates to a magnetic bearing control device and a vacuum pump.

2. Background Art

In a device configured to non-contact support a rotary body by a magnetic bearing, such as a magnetic bearing turbo-molecular pump, magnetic attraction of an electromagnet (i.e., electromagnet current) is controlled in real time based on a deviation (displacement) between a levitation position and a target levitation position of a rotor for the purpose of levitating the rotor to a predetermined target position. For detection of displacement of the rotor, there are a method using a special displacement sensor for detection and a self-sensing method using no displacement sensor. In the self-sensing method, the electromagnet has not only a typical actuator function (occurrence of the attraction for magnetic levitation), but also a self-sensing function.

In any methods, the sensing function employs an inductance method. A high-frequency carrier wave (a sensor carrier) is applied to a sensor coil or an electromagnet coil, and is amplitude-modulated according to an inductance change due to a levitation gap. The resultant is demodulated to obtain a levitation gap signal (a displacement signal). In demodulation processing, a method in which a digital technique is applied to take a modulated wave signal subjected to synchronous sampling by an AD converter, i.e., a direct method not requiring smoothing processing leading to occurrence of a delay, has been known.

On the other hand, for the actuator function of generating the magnetic attraction, it is configured such that switching voltage is applied from a PWM amplifier to the electromagnet coil to supply excitation current. Specifically, in the case of the self-sensing method, the electromagnet has not only the actuator function but also the sensing function. By detection of the electromagnet current, rotary body levitation position information (displacement information) is acquired. The PWM amplifier is driven with voltage. For controlling an excitation current value, the control of detecting the current flowing through the electromagnet to feed back such a value needs to be performed.

In the case of the PWM amplifier, spike-shaped noise due to, e.g., surge voltage is caused at switching timing in the electromagnet current, leading to a problem that the noise is superimposed on a detected current signal. Moreover, this spike-shaped noise is superimposed on current signal detection or displacement signal detection for other axes via ground line current.

In a case where such spike-shaped noise is superimposed on the displacement signal or the current signal, a filter is applied to perform noise reduction processing. However, trade-off between a noise reduction effect and deterioration of control stability due to a signal time delay is caused. Thus, filtering processing cannot be easily performed. When the noise is superimposed on a levitation control signal due to insufficient noise reduction processing, such noise is converted into vibration force at the electromagnet. This is a major cause for occurrence of vibration.

For this reason, in the technique described in Patent Literature 1 (JP-A-2014-137116), countermeasures are taken in such a manner that a duty variable range of PWM control of an excitation amplifier is limited. That is, for ensuring time until transient spike noise caused after switching is reduced, a duty is limited. Thus, PWM control is performed such that the length of an on-duty zone (or an off-duty zone) of a PWM carrier signal is constantly longer than a predetermined duration based on properties of spike noise attenuation in electromagnet current. At timing after a lapse of the predetermined duration from the timing of starting the on-duty zone (or the off-duty zone), a current detection signal is taken into the AD converter by synchronous sampling.

However, when disturbance acts on the rotor of the turbo-molecular pump from the outside, the rotor displaces from the target levitation position. Thus, under an abnormal situation such as earthquake, such displacement might increase to the extent that a rotor shaft contacts a touchdown bearing. In such a case, the operational capability of returning the rotor to the target levitation position by action of instantaneous great electromagnetic force for avoiding touchdown is required for the magnetic bearing. Thus, the on-duty zone in which current is increased by PWM driving needs to be expanded to a full duty to the extent possible. However, when the on-duty zone is expanded to the vicinity of the full duty, even if current detection is performed at timing right before rising of the on-duty zone, noise influence cannot be avoided. As described above, it is difficult to realize both of disturbance handling performance and noise influence reduction.

SUMMARY OF THE INVENTION

A magnetic bearing control device is configured to detect, by a sensor, excitation current supplied from an excitation amplifier to a magnetic bearing configured to magnetically levitate a rotor, thereby generating a voltage equivalent signal for PWM control of the excitation amplifier based on a current setting signal based on a deviation of a rotor levitation position with respect to a target levitation position and an excitation current detection signal of the sensor. The voltage equivalent signal is generated based on the current setting signal and a current deviation signal as a difference between the current setting signal and the excitation current detection signal.

Preferably the voltage equivalent signal is a signal obtained by mixing and addition of a first voltage equivalent signal generated in such a manner that a signal obtained by multiplication of the current deviation signal by a constant first gain value passes through a current controller including an integrator configured to output a time integral value and a proportional gain unit configured to output a proportional multiplication value, and a second voltage equivalent signal generated in such a manner that the current setting signal passes through a transfer function section set to cancel out a transfer function including an electric constant of an electromagnet of the magnetic bearing.

Preferably the current setting signal and a signal generated in such a manner that a signal obtained by multiplication of the current deviation signal by a constant first gain value passes through an integrator configured to output a time integral value are added and mixed together, and the voltage equivalent signal is generated in such a manner that the added and mixed signal passes through a transfer function section set to cancel out a transfer function including an electric constant of an electromagnet of the magnetic bearing.

Preferably instead of the current setting signal, a signal obtained by multiplication of the current setting signal by a constant second gain value of 0.5 to 1 is used.

Preferably the current deviation signal is calculated as a difference between a signal obtained by multiplication of the current setting signal by a predetermined third gain value and a signal obtained by multiplication of the excitation current detection signal by the third gain value, and the first gain value is set to equal to or more than 10 times greater than the third gain value and equal to or less than 1000 times greater than the third gain value.

Preferably a transfer function of the transfer function section includes an inductance equivalent value and a resistance equivalent value set based on the electric constant of the electromagnet, the inductance equivalent value is set to equal to or more than 0.1 times greater than an inductance of the electromagnet and equal to or less than 10 times greater than the inductance of the electromagnet, the resistance equivalent value is set to equal to or more than 0.1 times greater than a resistance of the electromagnet and equal to or less than 10 times greater than the resistance of the electromagnet, and a ratio (Inductance Equivalent Value)/(Resistance Equivalent Value) of the inductance equivalent value to the resistance equivalent value is set to equal to or more than 0.1 times greater than a ratio (Inductance)/(Resistance) of the inductance to the resistance and equal to or less than 10 times greater than the ratio (Inductance)/(Resistance).

Preferably a vacuum pump comprises: a magnetic bearing configured to magnetically levitate and support a pump rotor; a motor configured to rotatably drive the pump rotor; and the magnetic bearing control device configured to control the magnetic baring.

According to the present invention, both of disturbance handling performance and noise influence reduction can be realized.

DETAILED DESCRIPTION OF THE EXEMPLARY EMBODIMENTS

Figure 1:
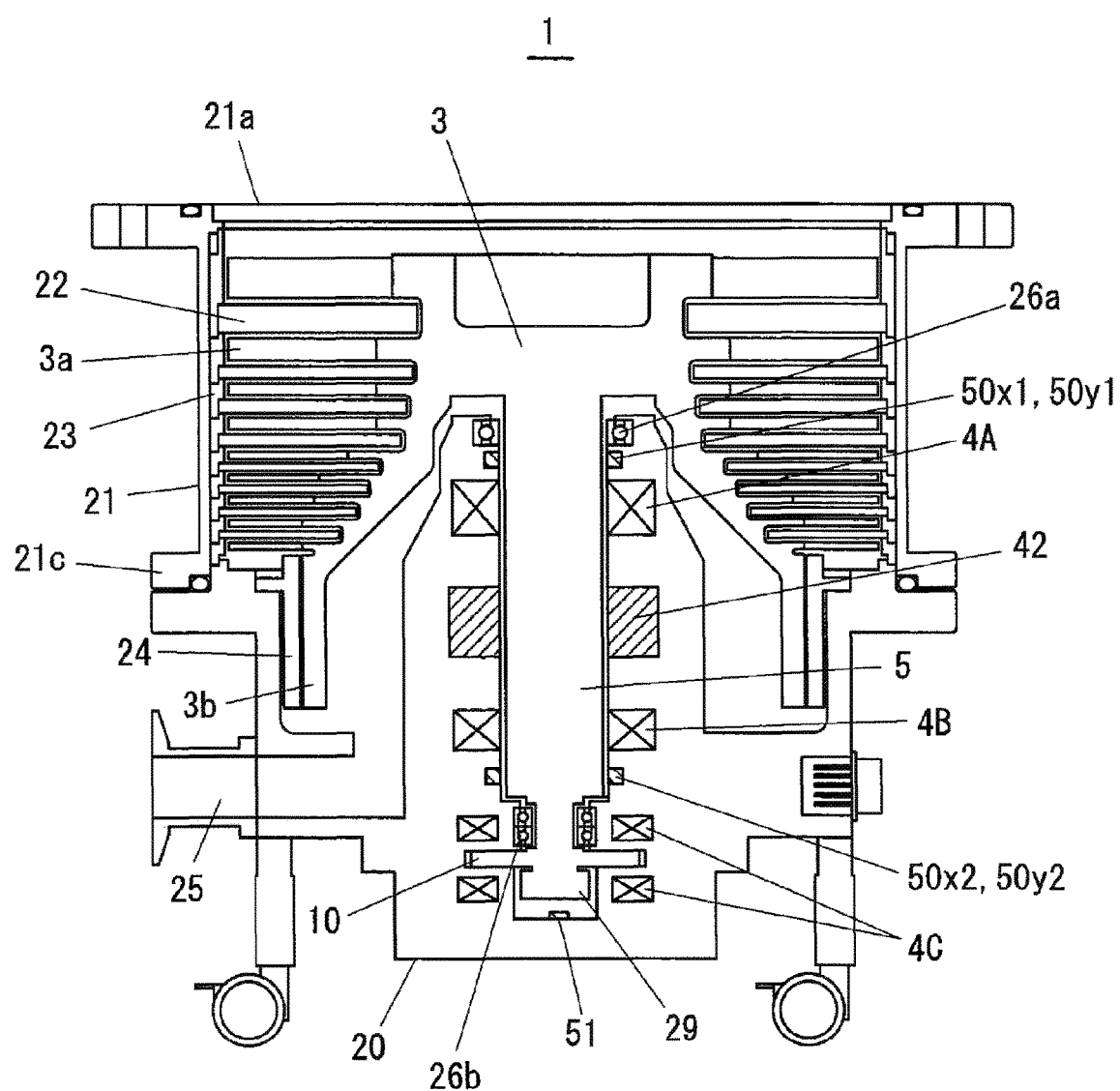
FIG. 1 is a view of a schematic configuration of a magnetic bearing turbo-molecular pump including a magnetic bearing device employing a displacement sensor method.

Hereinafter, an embodiment of the present invention will be described with reference to the drawings. FIG. 1 is a view of a schematic configuration of a magnetic bearing turbo-molecular pump including a magnetic bearing device employing a displacement sensor method. The turbo-molecular pump includes a pump unit 1 and a control unit configured to drive and control the pump unit 1. Note that the control unit is not shown in FIG. 1.

A rotor shaft 5 provided at a rotor 3 is non-contact supported by radial magnetic bearings 4A, 4B and axial magnetic bearings 4C. The magnetic bearings 4C are arranged to sandwich, in an axial direction, a thrust disc 10 fixed to a lower portion of the rotor shaft 5. Displacement of a levitation position of the rotor shaft 5 is detected by radial displacement sensors 50$x$1, 50$y$1, 50$x$2, 50$y$2 and an axial displacement sensor 51. An inductance displacement sensor configured such that a coil is wound around a sensor core is used as each of the displacement sensors 50$x$1, 50$y$1, 50$x$2, 50$y$2 and 51.

The rotor 3 magnetically and rotatably levitated by the magnetic bearings is rotatably driven at high speed by a motor 42. For example, a brushless DC motor is used as the motor 42. Note that the motor 42 is schematically illustrated in FIG. 1. More specifically, a portion indicated by a reference numeral "42" forms a motor stator, and a motor rotor is provided at the rotor shaft 5.

A sensor target 29 is provided at a lower end of the rotor shaft 5 rotatably driven by the motor 42. The above-described axial displacement sensor 51 is disposed at a position facing a lower surface of the sensor target 29. When the magnetic bearings are not in operation, the rotor shaft 5 is supported by emergency mechanical bearings 26a, 26b.

The rotor 3 is provided with a plurality of rotor blades 3a and a cylindrical portion 3b forming a rotary-side exhaust function section. On the other hand, stationary blades 22 and a screw stator 24 forming a stationary-side exhaust function section are provided on a stationary side. The stationary blades 22 and the rotor blades 3a are alternately arranged in the axial direction. The screw stator 24 is provided with a predetermined gap on an outer peripheral side of the cylindrical portion 3b.

Each stationary blade 22 is placed on a base 20 with a corresponding one of spacer rings 23 being interposed therebetween. When a fixed flange 21c of a pump case 21 is fixed to the base 20 with bolts, the stack of spacer rings 23 is sandwiched between the base 20 and the pump case 21, and therefore, the position of each stationary blade 22 is determined. The base 20 is provided with an exhaust port 25, and a back pump is connected to the exhaust port 25. The rotor 3 is magnetically levitated while being rotatably driven at high speed by the motor 42, and in this manner, gas molecules are exhausted from a suction port 21a toward the exhaust port 25.

Figure 2:
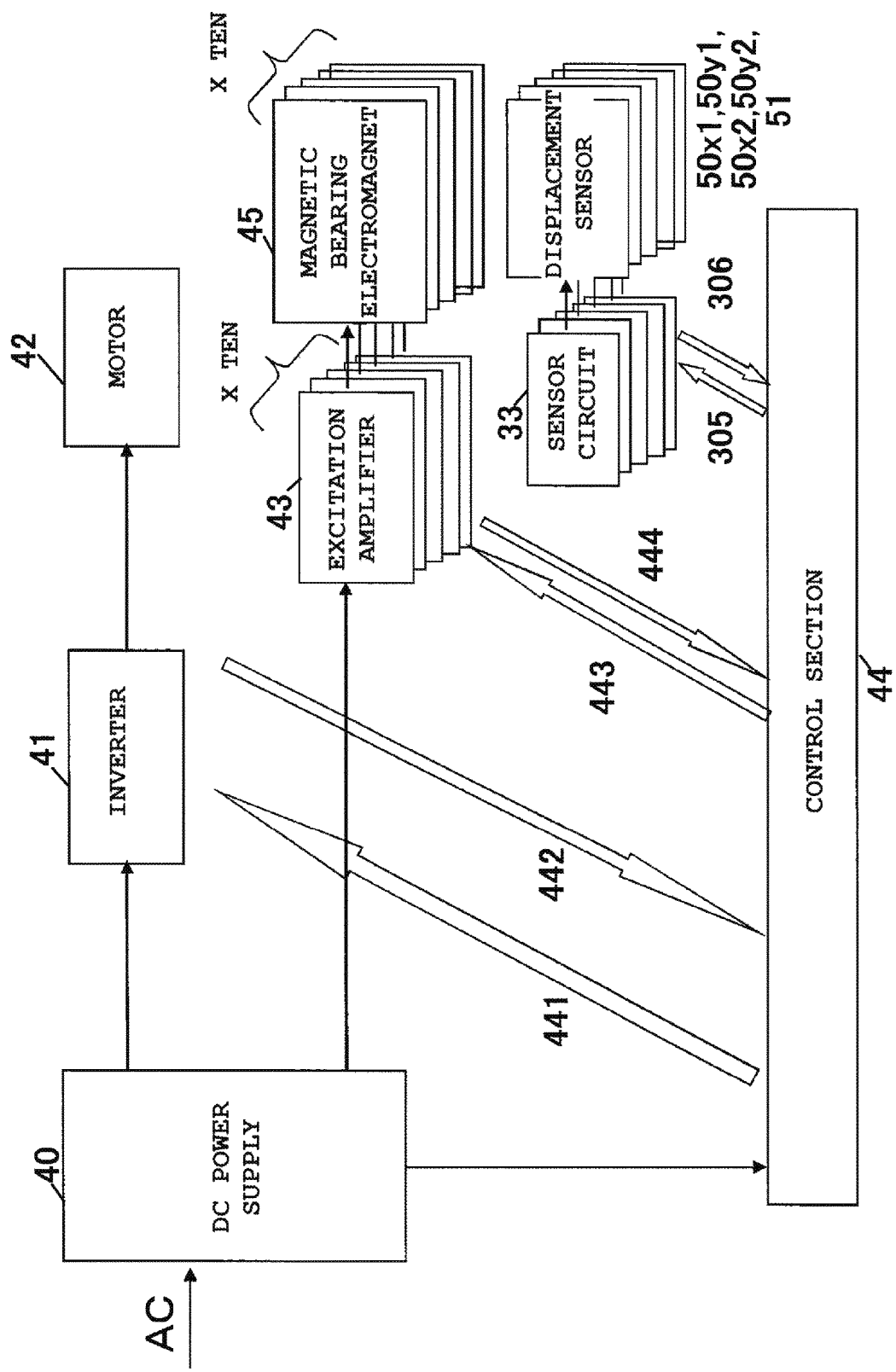
FIG. 2 is a block diagram of a schematic configuration of a control unit.

FIG. 2 is a block diagram of a schematic configuration of the control unit. AC input from the outside is converted from AC into DC by a DC power supply 40 provided at the control unit. The DC power supply 40 generates power for an inverter 41, power for each excitation amplifier 43, and power for a control section 44.

The inverter 41 configured to supply current to the motor 42 includes a plurality of switching elements. The motor 42 is driven in such a manner that the control section 44 controls ON/OFF of these switching elements.

As described above, the magnetic bearings for magnetically levitating and supporting the rotor shaft 5 form a five-axis control magnetic bearing for four axes in a radial direction and a single axis in the axial direction. A pair of magnetic bearing electromagnets is provided for each axis. Thus, ten magnetic bearing electromagnets 45 are provided as illustrated in FIG. 2. The excitation amplifier 43 configured to supply current to the magnetic bearing electromagnet 45 is provided for each of the ten magnetic bearing electromagnets 45.

The control section 44 configured to control driving of the motor 42 and driving of the magnetic bearings includes, for example, a digital arithmetic unit such as a field programmable gate array (FPGA), and a peripheral circuit thereof. For motor control, a PWM control signal 441 for controlling ON/OFF of the switching elements provided at the inverter 41 is input from the control section 44 to the inverter 41. Moreover, a signal 442 on the phase voltage and phase current of the motor 42 is input from the inverter 41 to the control section 44.

For magnetic bearing control, a PWM gate drive signal 443 for controlling ON/OFF of switching elements included in each excitation amplifier 43 is input from the control section 44 to each excitation amplifier 43. Moreover, a current detection signal 444 on a current value of each magnetic bearing electromagnet 45 is input from each excitation amplifier 43 to the control section 44.

Each of the displacement sensors 50x1, 50y1, 50x2, 50y2, 51 is provided with a sensor circuit 33. A sensor carrier signal (a carrier signal) 305 is input from the control section 44 to each sensor circuit 33. A sensor signal 306 modulated due to displacement of the rotor shaft is input from each sensor circuit 33 to the control section 44.

Figure 3:
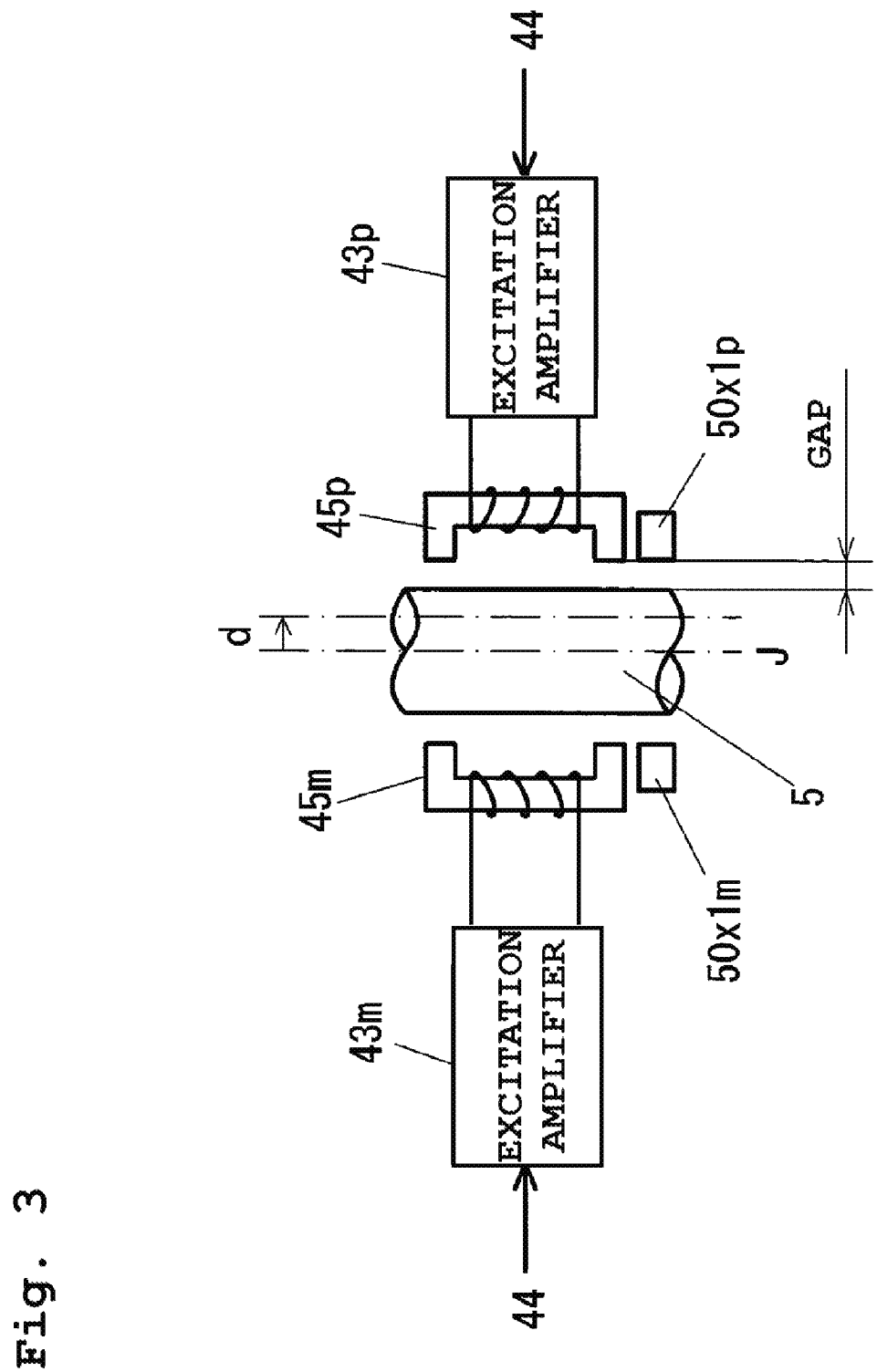
FIG. 3 is a schematic diagram of a magnetic bearing electromagnet for a single control axis.

FIG. 3 is a schematic diagram of the magnetic bearing electromagnets 45 for a single control axis. Two magnetic bearing electromagnets 45m, 45p are arranged facing each other to sandwich the rotor shaft 5. A character "J" represents a levitation target position when the rotor shaft 5 is magnetically levitated. As described above, the excitation amplifier 43 is provided for each of the magnetic bearing electromagnets 45m, 45p.

When the rotor shaft 5 moves, as illustrated in FIG. 3, closer to the magnetic bearing electromagnet 45p by a displacement d to change a gap between the magnetic bearing electromagnet 45p and the rotor shaft 5, such a gap change is detected by a pair of displacement sensors 50x1m, 50x1p. Then, according to the detected displacement, the excitation current of the magnetic bearing electromagnet 45p is decreased, and the excitation current of the magnetic bearing electromagnet 45m on the opposite side is increased. As a result, the rotor shaft 5 is pulled toward the magnetic bearing electromagnet 45m such that a deviation of an actual levitation position with respect to the target levitation position J is decreased.

Figure 4:
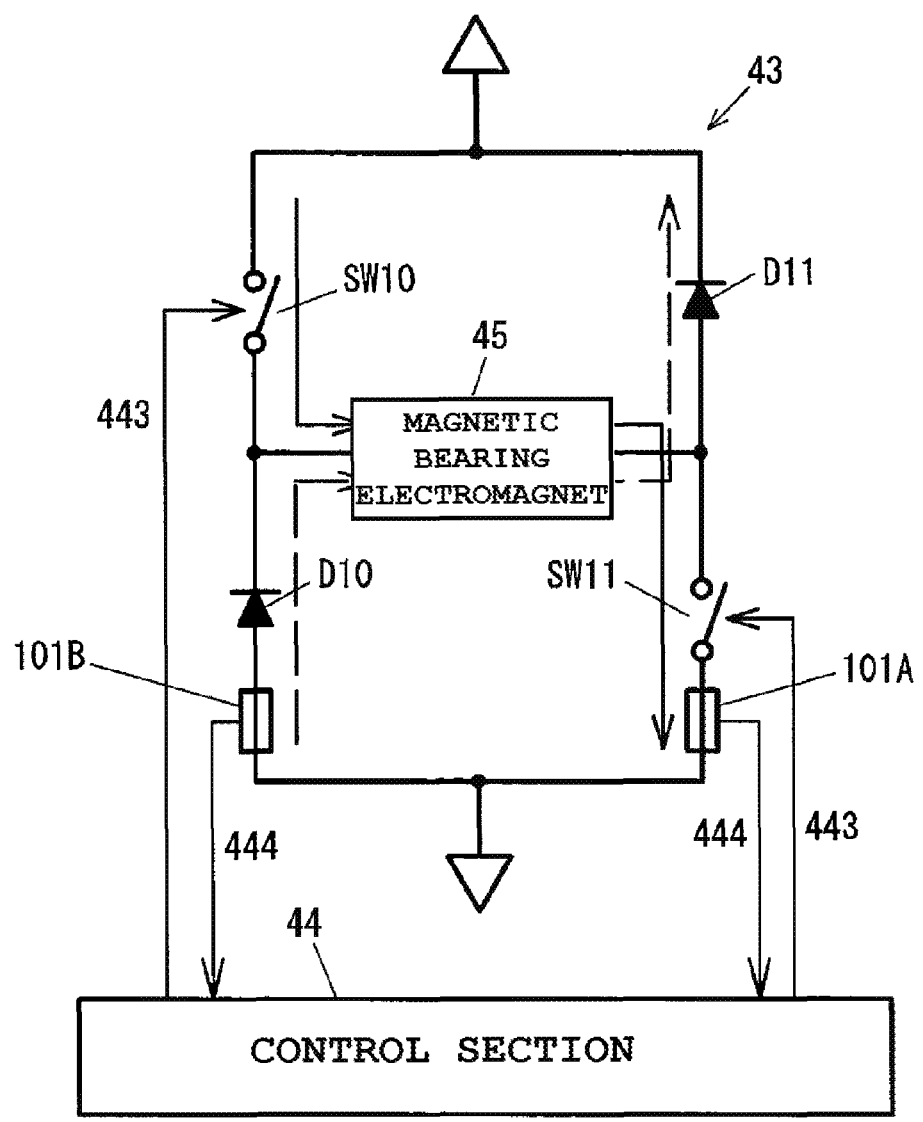
FIG. 4 is a diagram of an example of an excitation amplifier.

FIG. 4 is a diagram of an example of the excitation amplifier 43 provided corresponding to each magnetic bearing electromagnet 45. The excitation amplifier 43 is commonly driven based on PWM control. In the present embodiment, a most common two-quadrant excitation amplifier 43 in a PWM control circuit will be described as an example. The two-quadrant excitation amplifier 43 includes two switching elements SW10, SW11 as illustrated in FIG. 4, and two-quadrant driving of the excitation amplifier 43 is performed in such a manner that the switching elements SW10, SW11 are simultaneously turned on/off. The "two-quadrant" described herein expresses the operation of turning on/off the switching elements SW10, SW11, thereby reversing positive and negative sides in the direction of current from the DC power supply while excitation current flowing through an electromagnet coil is constantly maintained in one direction.

As illustrated in FIG. 4, the excitation amplifier 43 is configured such that two pairs of the switching element and a diode connected in series are connected in parallel to the DC power supply. The magnetic bearing electromagnet 45 is connected in between the switching element SW10 and the diode D10 and between the switching element SW11 and the diode D11.

The PWM gate drive signal 443 is input from the control section 44 to the switching elements SW10, SW11. When the switching elements SW10, SW11 are simultaneously turned on, current flows as indicated by solid arrows. When the switching elements SW10, SW11 are simultaneously turned off, current flows as indicated by dashed arrows. A current value in an ON-state is measured by a current sensor 101A, and a current value in an OFF-state is measured by a current sensor 101B. For example, shunt resistors are used as the current sensors 101A, 101B, and the voltage of the shunt resistor is used as the current detection signal. The current detection signal 444 is input to the control section 44. At this point, there are a case (not shown) where two current detection signals are directly input and a case (not shown) where both current detection signals are averaged into a single signal in an averaging circuit and such a signal is input. Any of these cases can be employed.

Figure 5:
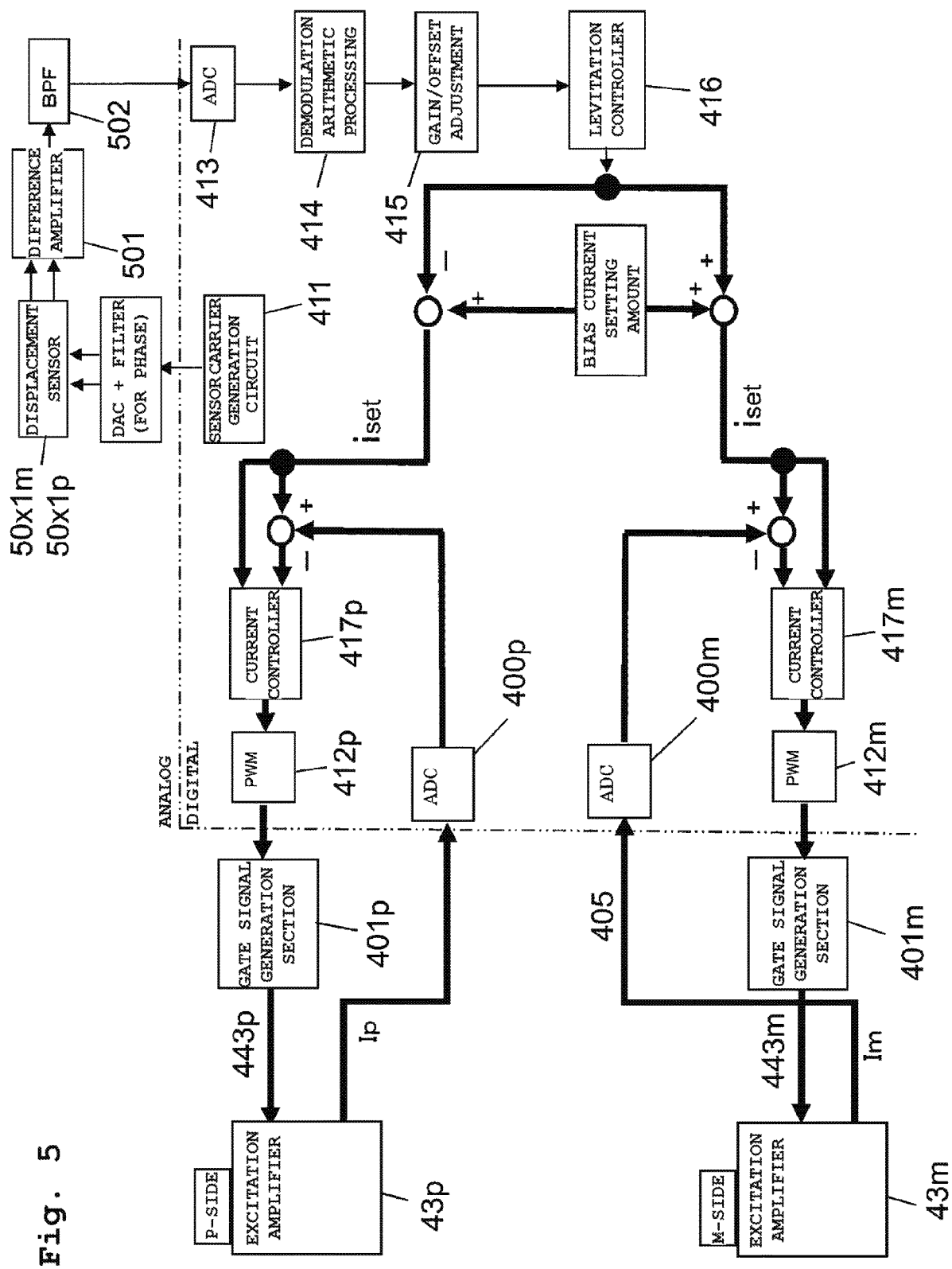
FIG. 5 is a functional block diagram for magnetic bearing control.

FIG. 5 is a functional block diagram in magnetic bearing control in the control section 44, and shows one (e.g., the single axis illustrated in FIG. 3) of the five control axes. The pair of magnetic bearing electromagnets 45p, 45m is provided for a single control axis, and the excitation amplifier 43 (43p, 43m) is provided for each of the magnetic bearing electromagnets 45p, 45m. Although not shown in the figure, each of the excitation amplifiers 43p, 43m of FIG. 5 is provided with the current sensor (the current sensor 101A, 101B illustrated in FIG. 4) configured to detect electromagnet current, and the current detection signals Ip, Im are output from the excitation amplifiers 43p, 43m. Note that for the sake of simple description, the above-described configuration (the case not shown in FIG. 4) using the current signals converted into the single signal is illustrated in FIG. 5.

A sensor carrier signal (a digital signal) generated in a sensor carrier generation circuit 411 is converted from the digital signal into an analog signal, and then, is applied to the pair of displacement sensors 50x1m, 50x1p via a phase adjustment filter circuit. A differential signal is, by a difference amplifier 501, obtained from the sensor signals modulated by the displacement sensors 50x1m, 50x1p. After the differential signal has been filtered by a bandpass filter 502, the resultant is AD-sampled by an AD converter 413.

In a demodulation arithmetic section 414, demodulation arithmetic processing is performed based on sampling data. Further, in a gain/offset adjustment section 415, gain adjustment and offset adjustment are performed for the demodulated signal. Commonly, the target levitation position J of the rotor shaft 5 is set to a middle position between the displacement sensors 50x1m, 50x1p. In this case, a displacement signal output from the gain/offset adjustment section 415 indicates the deviation of the rotor levitation position with respect to the target levitation position J.

In a levitation controller 416, a levitation control current setting is, based on the signal output from the gain/offset adjustment section 415, generated by proportional control, integral control, derivative control, phase correction, and other types of control compensation. A value obtained in such a manner that a bias current setting amount is added to the generated levitation control current setting with a reversed sign is used as a current setting signal iset for P-side control, and a value obtained in such a manner that the bias current setting amount is added to the generated levitation control current setting is used as the current setting signal iset for M-side control. The current setting signal iset described herein has different values between a P-side and an M-side as described above. For the sake of simple description below, the current setting signal is represented by "iset" without being distinguished between the P-side and the M-side.

In the present embodiment, the current setting signal iset is branched into two signals. One signal is directly input to a current controller 417p, 417m. The other signal is subjected to subtraction of the current detection signal Ip, Im taken by an AD converter 400p, 400m, and such a subtraction result (hereinafter referred to as a "current deviation signal") is input to the current controller 417p, 417m. The current controllers 417p, 417m generate, based on the input current setting signal iset and the input current deviation signal, a voltage equivalent signal for PWM control of the excitation amplifiers 43p, 43m. A PWM arithmetic section 412p, 412m generates a PWM control signal based on a voltage equivalent signal from the current controller 417p, 417m.

Based on the PWM control signal generated by the PWM arithmetic section 412p, a gate signal generation section 401p outputs a PWM gate drive signal 443p to the P-side excitation amplifier 43p. Similarly, based on a PWM control signal generated by the PWM arithmetic section 412m, a gate signal generation section 401m outputs a PWM gate drive signal 443m to the M-side excitation amplifier 43m. Then, ON/OFF of the switching elements SW10, SW11 (see FIG. 4) of each of the excitation amplifiers 43p, 43m is controlled based on the PWM gate drive signals 443p, 443m.

Figure 6:
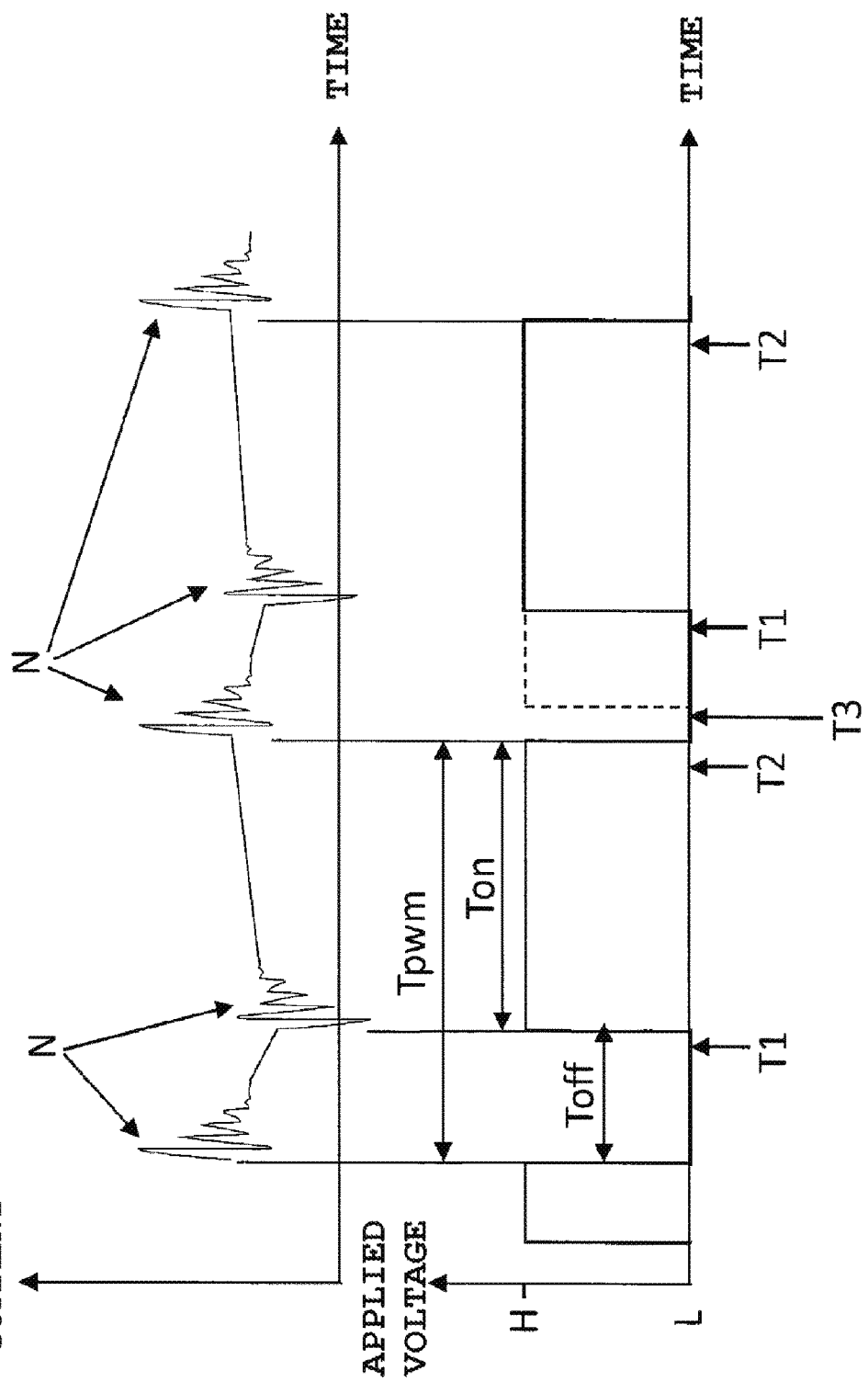
FIGS. 6A and 6B are graphs for describing occurrence of noise and current detection timing.

Rectangular voltage as illustrated in FIG. 6B is applied to the excitation amplifiers 43p, 43m by ON/OFF of the switching elements SW10, SW11. When the switching elements SW10, SW11 are ON, H voltage (input DC voltage) is applied. When the switching elements SW10, SW11 are OFF, L voltage (0 V) is applied. Note that "Toff" represents an off-duty zone, and "Ton" represents an on-duty zone. Moreover, "Tpwm" represents a single PWM carrier cycle.

Normally, conduction/blocking operation is performed for repetitive voltage at high speed by a switching element such as a MOSFET. In such operation, spike-shaped noise N as illustrated in FIG. 5A is caused in excitation current, and such noise is superimposed on current sensor signal lines of the excitation amplifiers 43p, 43m. Thus, in the technique described in Patent Literature 1, current detection is performed at the timing T1, T2 of reducing noise influence.

However, when disturbance acts on a levitated body (the rotor) of the turbo-molecular pump from the outside, the rotor shaft 5 displaces from the target levitation position J. For this reason, under an abnormal situation such as earthquake, such displacement might be increased to the extent that the rotor shaft 5 contacts a touchdown bearing. In such a case, the operational capability of returning the rotor shaft 5 to the target levitation position J by action of instantaneous great electromagnetic force for avoiding touchdown is required for the magnetic bearing. Thus, the on-duty zone (the zone with the H voltage) in which current is increased by PWM driving needs to be expanded to a full duty to the extent possible. However, when the on-duty zone is expanded to the vicinity of the full duty as indicated by a dashed line of FIG. 6B, even if current detection is performed at timing T3 right before rising of the on-duty zone, the influence of the noise N cannot be avoided.

Figure 7:
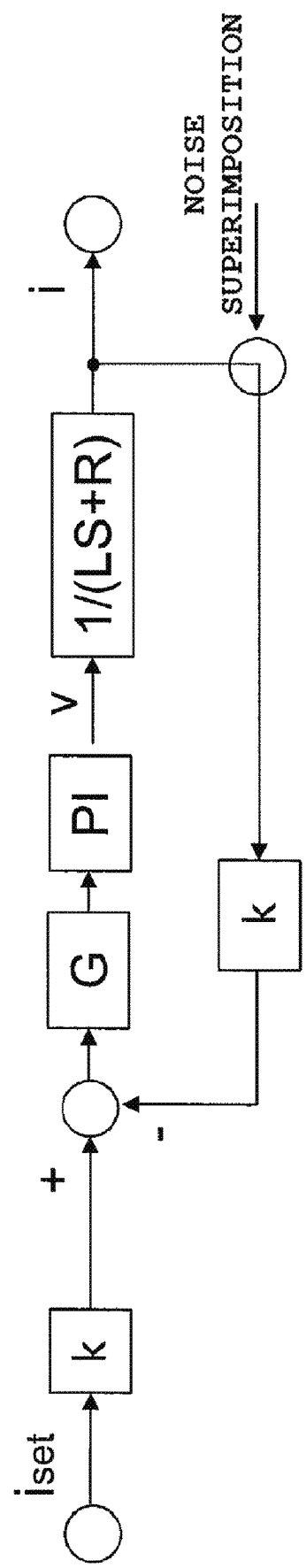
FIG. 7 is a diagram for describing influence of noise superimposition in a typical configuration.

In a typical magnetic bearing control device, the current controllers 417p, 417m illustrated in FIG. 5 generate the voltage equivalent signal based only on the current deviation signal obtained by subtraction of the current detection signal Ip, Im from the current setting signal iset. FIG. 7 is a transfer function block diagram of a configuration of a typical current controller. The noise superimposition influence in the typical configuration will be described with reference to FIG. 7.

For reducing, as much as possible, a steady-state error from the current setting signal iset, the current controller is configured for PI control, i.e., includes a proportional (P) element and an integral (I) element. Moreover, the gain (G) of the entirety of the current controller is set to a greater value than a feedback line gain (K) (G»k). Normally, G is set to a great value of equal to or more than 1000 times greater than k, and about one hundred thousand times greater than k in some cases. Thus, the current controller can be taken as a linear amplifier with a constant gain, the closed loop gain of the excitation amplifier being the inverse number (1/k) of the feedback gain.

A transfer function 1/(LS+R) for the electromagnet shows a slow response, and therefore, responsiveness is enhanced by an increase in the gain G as described above. Note that a k gain for canceling out 1/k such that the input current setting signal iset becomes substantially equivalent to an output is provided at an input section.

In the typical configuration of FIG. 7, when the noise is superimposed on a current detection signal line, the superimposed noise is amplified in proportional to the gain G. High-speed responsiveness to a rapid change in the current setting signal iset and steady-state error properties are required for the excitation amplifier of the magnetic bearing. For obtaining these properties, the gain G is set to a great value as described above. Thus, the noise is greatly amplified due to the great gain G. The amplified noise is superimposed on the deviation signal, and then, is applied as a voltage signal (PWM voltage) to the electromagnet through the PI transfer function. As a result, the rotor shaft 5 vibrates due to excitation current attraction fluctuation caused by the influence of the noise, and as reaction, the pump main body vibrates.

For reducing such noise influence, the present embodiment is configured as follows: the current setting signal iset is branched into two signals as illustrated in FIG. 5; and then, the current deviation signal generated from one of the branched current setting signals iset and the current detection signal Ip, Im is input to the current controller 417p, 417m, and the other one of the branched current setting signals iset is input to the current controller 417p, 417m.

Figure 8:
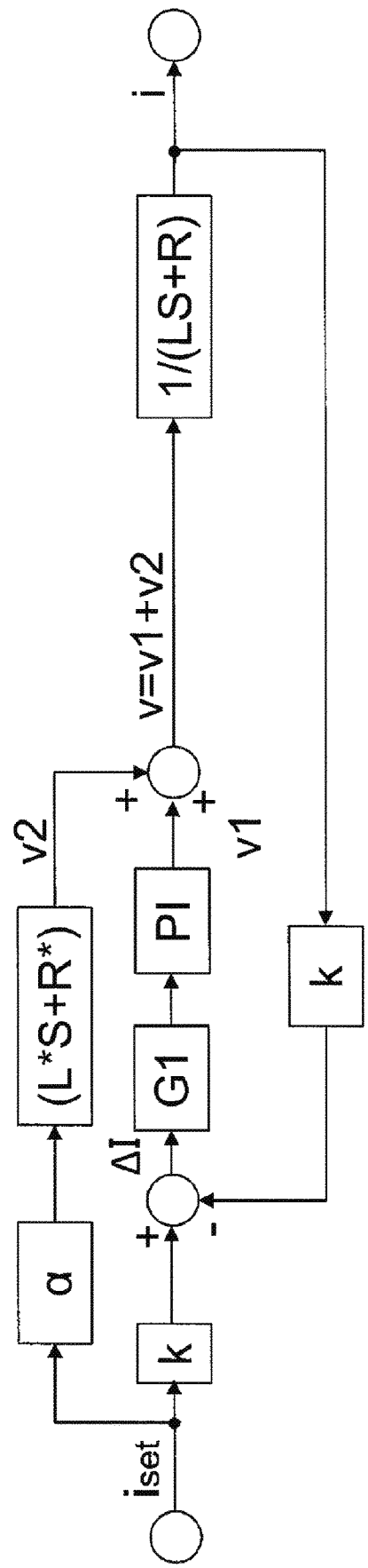
FIG. 8 is an example of a transfer function block diagram.

FIG. 8 is a transfer function block diagram in the case of the configuration of FIG. 5, and corresponds to FIG. 7 of the typical case. One of the branched current setting signals iset is multiplied by the constant gain k, and then, is subjected to subtraction of the product of the current detection signal and the gain k. In this manner, a current deviation signal ΔI is generated. This current deviation signal ΔI is multiplied by a gain G1. Then, from the resultant signal, a voltage equivalent signal v1 is generated through the PI transfer function.

The other one of the branched current setting signals iset is multiplied by a predetermined constant gain a. Then, from the signal obtained by multiplication by the gain a, a second voltage equivalent signal v2 is generated through a transfer function including (L*S+R*) where L* and R* are derivatives substantially cancelling out the inductance L and resistance R of the electromagnet. Subsequently, the voltage equivalent signal v1 and the voltage equivalent signal v2 are mixed and added together, and therefore, the mixed signal v=v1+v2 is taken as the voltage equivalent signal to generate the PWM voltage.

In FIG. 8, the gain G1 is set to equal to or less than 1/10 of the typical gain G illustrated in FIG. 7. That is, the gain G1 is set to a value of equal to or more than 10 times greater than the gain k and equal to or less than 1000 times greater than the gain k. As described above, the gain G1 is set to less than G so that the noise superimposition influence can be reduced. Thus, vibration of the rotor can be reduced, and therefore, the low-vibration magnetic bearing device and the low-vibration magnetic bearing turbo-molecular pump can be provided.

Moreover, as in the case of the second voltage equivalent signal v2, the branched current setting signal iset is directly added to the PI output, leading to high-speed responsiveness. Even when the value of the gain G1 is decreased for reducing the noise influence, required high-speed performance can be ensured. Meanwhile, a typical block function (a closed loop block) is provided, and therefore, the function of reducing the steady-state error can be also provided.

Normally, the turbo-molecular pump is often placed in such an upright attitude that a rotary shaft faces in the direction of gravitational force. However, the turbo-molecular pump might be placed facing in an orthogonal direction (a horizontal attitude) or other optional directions. Thus, for maintaining levitation of the rotor shaft 5 at the predetermined target levitation position J, a DC current of equal to or higher than a bias current flows through the electromagnet generating force in the direction opposite to the direction of gravitational force.

The coil of the electromagnet is wound around a ferromagnetic core material such as a core configured such that silicon steel plates are stacked on each other. Thus, the inductance is determined according to the BH curve of the core material. Commonly, tendency shows that the inductance L decreases and the resistance R increases in the case of great current or a high temperature. Thus, for the transfer function including (L*S+R*), parameter values can be, in principle, optionally changed according to excitation current and an ambient temperature, thereby cancelling out the effect of the transfer function 1/(LS+R). Note that similar advantageous effects can be exerted when L* is about 0.1 to 10 times greater than L, R* is about 0.1 to 10 times greater than R, and (L*/R*) is equal to or more than 0.1 times greater than (L/R) and equal to or less than 10 times greater than (L/R), considering redundancy.

A value of around one is taken as a reference value of a. However, as long as the value of the gain G1 is not extremely lower than the typical value of G (e.g., about 1/10), the advantageous effects can be exerted even with about 0.5.

(First Variation)

Figure 9:
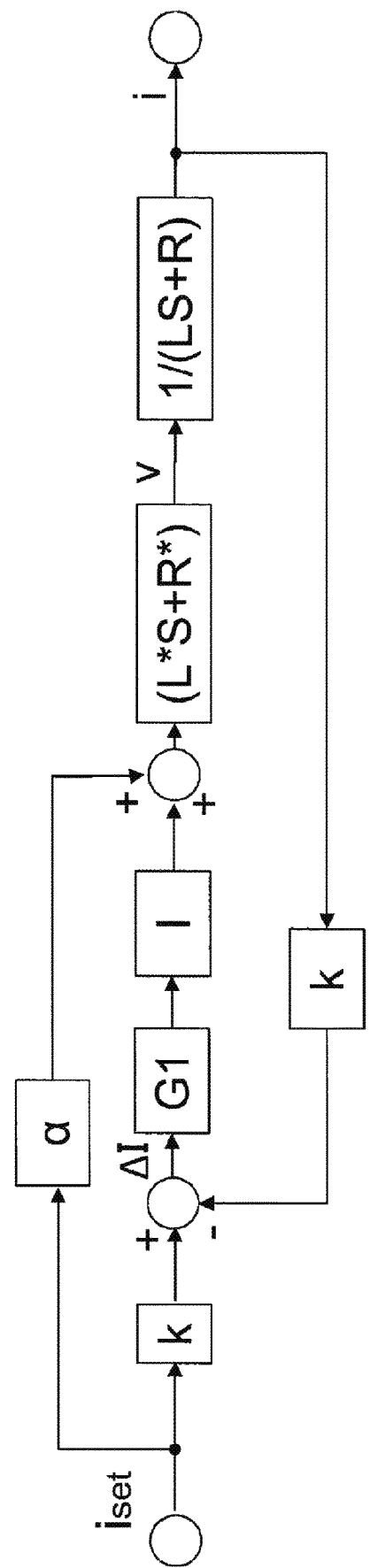
FIG. 9 is another example of the transfer function block diagram.

FIG. 9 is a diagram of a first variation of the above-described embodiment, and corresponds to the transfer function block diagram of FIG. 8. In the transfer function block diagram of FIG. 9, it is configured such that a PI control section of FIG. 8 is divided in the form of I Control+(L*S+R*). Even in such a configuration, features and advantageous effects similar to those of the case illustrated in FIG. 8 can be exerted.

(Second Variation)

Figure 10:
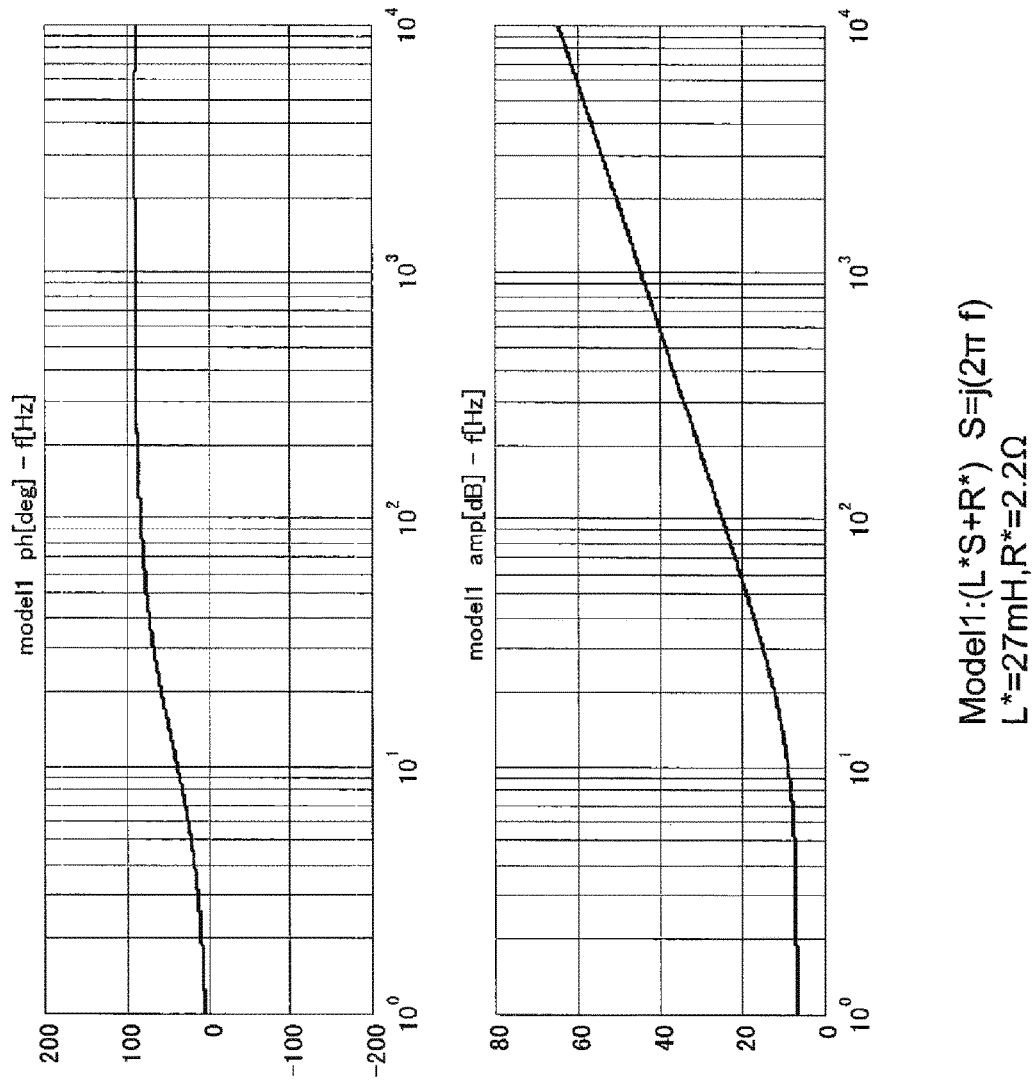
FIG. 10 is a Bode diagram of a transfer function (L*S+R*)
Figure 11:
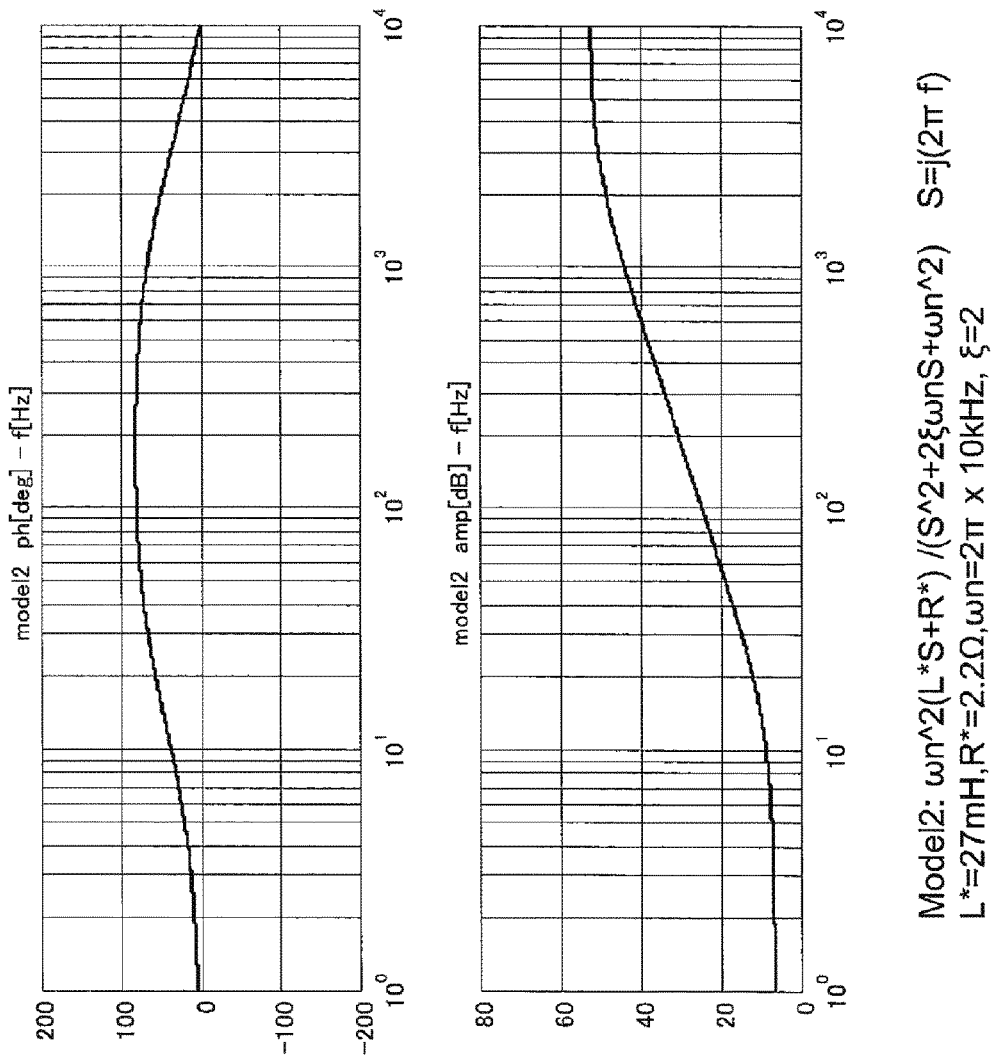
FIG. 11 is a Bode diagram of a transfer function shown in Expression (1)
Figure 12:
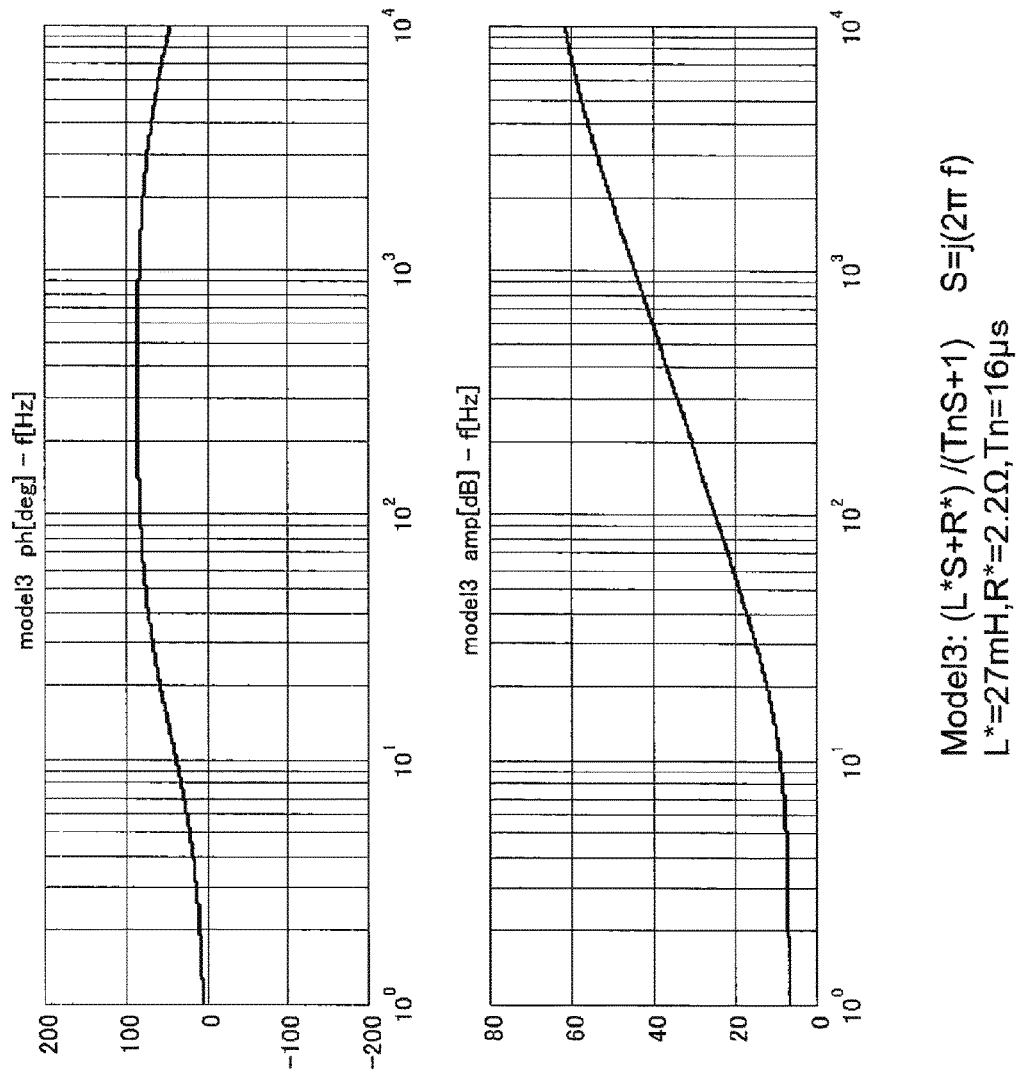
FIG. 12 is a Bode diagram of a transfer function shown in Expression (2)
Figure 13:
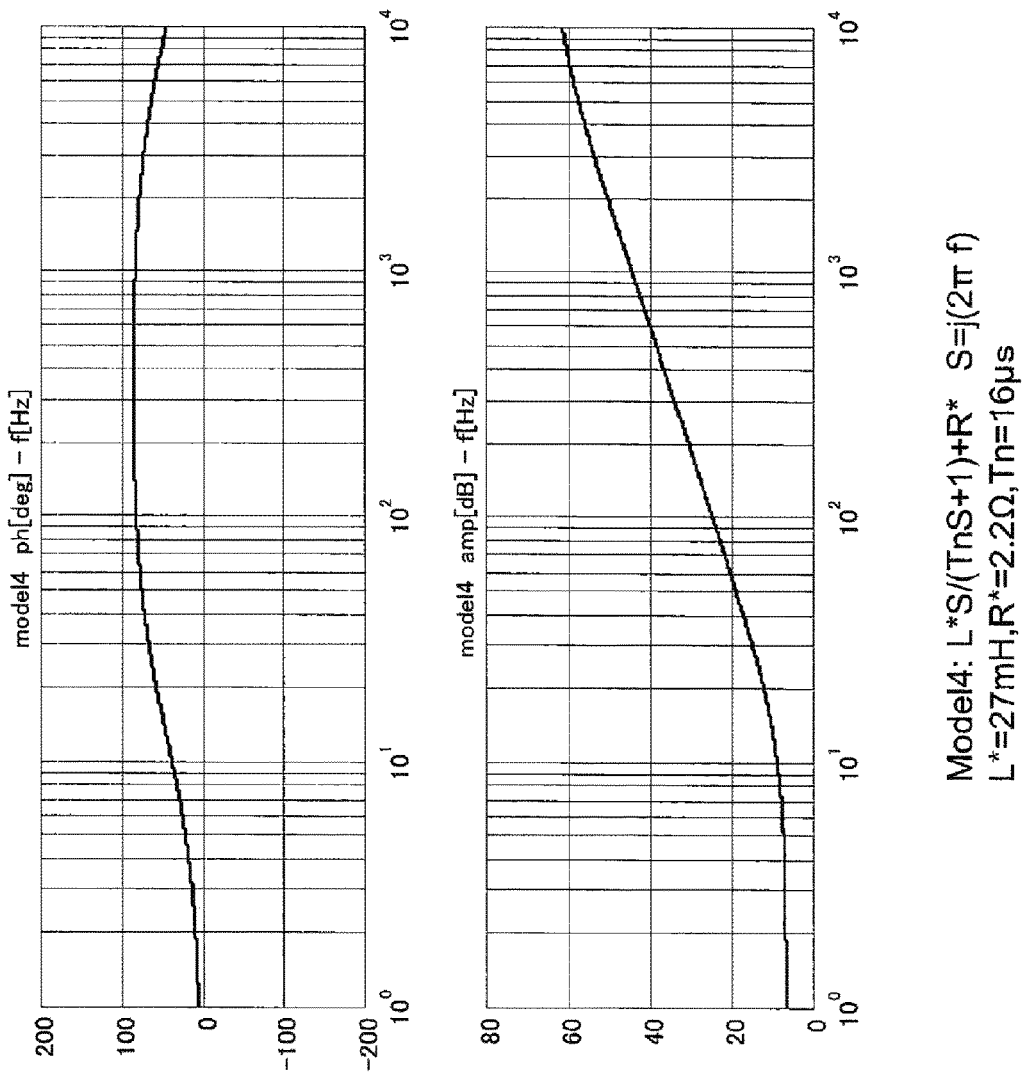
FIG. 13 is a Bode diagram of a transfer function shown in Expression (3).

FIGS. 10 to 13 are graphs for describing a second variation of the above-described embodiment. In FIGS. 8 and 9, the transfer function including (L*S+R*) needs to be proper. For example, the configuration including the integral plus proportional unit may be a configuration including a pseudo-integral plus proportional unit as in Expressions (1) to (3) as described later. FIG. 10 shows a Bode diagram of (L*S+R*). On the other hand, FIG. 11 is a Bode diagram in the case of Expression (1), FIG. 12 is a Bode diagram in the case of Expression (2), and FIG. 13 is a Bode diagram in the case of Expression (3).

$$\omega n^2(L^*S+R^*)/(S^2+2\xi\omega nS+\omega n^2) \text{ where } 1/\omega n \ll L^*/R^* \quad (1)$$

$$(L^*S+R^*)/(TnS+1) \text{ where } Tn \ll L^*/R^* \quad (2)$$

$$L^*S/(TnS+1)+R^* \text{ where } Tn \ll L^*/R^* \quad (3)$$

Note that in the above-described embodiment, the magnetic bearing device configured such that displacement of the rotor shaft 5 is detected by the displacement sensors has been described as an example. However, the present invention is similarly applicable to a self-sensing magnetic bearing device using no displacement sensor. In the case of the self-sensing method, electromagnet current contains not only levitation control current and bias current, but also current with a sensor carrier component for displacement detection. The sensor carrier component is amplitude-modulated by rotor displacement, and therefore, is detected to obtain displacement information. In the case of the self-sensing method, the current setting signal iset of FIGS. 7 to 9 is generated based on the displacement information. Thus, in the case of applying the present invention to the self-sensing magnetic bearing device, features and advantageous effects similar to those of the case of the above-described method using the displacement sensors can be also exerted.

The above-described embodiment exerts the following features and advantageous effects.

(1) As illustrated in FIG. 5, The magnetic bearing control device is configured to detect, by the current sensors (not shown), the excitation current supplied from the excitation amplifiers 43p, 43m to the magnetic bearings configured to magnetically levitate the rotor, thereby generating the voltage equivalent signal for PWM control of the excitation amplifiers 43p, 43m based on the current setting signal iset and the current detection signals Ip, Im of the current sensors based on the deviation of the rotor levitation position with respect to the target levitation position. In the magnetic bearing control device, the voltage equivalent signal is generated based on the current setting signal iset and the current deviation signal as the difference between the current setting signal iset and the excitation current detection signal Ip, Im.

As described above, the voltage equivalent signal is generated based on the current deviation signal and the current setting signal iset, and therefore, both of disturbance handling performance and noise influence reduction can be realized as described above.

(2) For example, as illustrated in FIG. 8, the voltage equivalent signal is preferably the signal v obtained by mixing and addition of the first voltage equivalent signal v1 generated in such a manner that the signal obtained by multiplication of the current deviation signal ΔI by the constant first gain value G1 passes through the current controller PI including the integrator configured to output a time integral value and the proportional gain unit configured to output a proportional multiplication value and the second voltage equivalent signal v2 generated in such a manner that the current setting signal iset passes through the transfer function section (L*S+R*) set to cancel out the transfer function (1/(LS+R)) including the electric constant of the electromagnet of the magnetic bearing. Since the voltage equivalent signal v2 based on the current setting signal iset is added and mixed, the noise influence can be reduced without lowering of responsiveness even when the gain G1 is less than the typical value for reducing the influence of the noise superimposed on a current sensor line.

(3) Moreover, as illustrated in FIG. 9, the current setting signal iset and the signal generated in such a manner that the signal obtained by multiplication of the current deviation signal ΔI by the constant first gain value G1 passes through the integrator I configured to output the time integral value may be added and mixed together, and the voltage equivalent signal v may be generated in such a manner that the added and mixed signal passes through the transfer function section (L*S+R*) set to cancel out the transfer function including the electric constant of the electromagnet of the magnetic bearing.

(4) Further, as in FIGS. 8 and 9, the gain value α is adjusted by multiplication of the current setting signal iset by the constant gain value α of 0.5 to 1, and in this manner, the transfer function (1/(LS+R)) including the electric constant of the electromagnet can be accurately canceled out.

(5) Note that when the current deviation signal ΔI is calculated as the difference between the signal obtained by multiplication of the current setting signal iset by the predetermined gain k and the signal obtained by multiplication of the current detection signal Ip, Im by the gain k, the gain G1 is preferably set to equal to or more than 10 times greater than the gain k and equal to or less than 1000 times greater than the gain k.

(6) Moreover, the transfer function of the transfer function section (L*S+R*) preferably includes the inductance equivalent value L* and the resistance equivalent value R* set based on the electric constant of the electromagnet, the inductance equivalent value L* is preferably set to equal to or more than 0.1 times greater than the inductance of the electromagnet and equal to or less than 10 times greater than the inductance of the electromagnet, the resistance equivalent value R* is preferably set to equal to or more than 0.1 times greater than the resistance of the electromagnet and equal to or less than 10 times greater than the resistance of the electromagnet, and the ratio (L*/R*) of the inductance equivalent value L* to the resistance equivalent value R* is preferably set to equal to or more than 0.1 times greater than the ratio (L/R) of the inductance L to the resistance R and equal to or less than 10 times greater than the ratio (L/R).

Note that in the above-described embodiment, the magnetic bearing turbo-molecular pump as a vacuum pump has been described as an example, but the present invention is not limited to the vacuum pump. The present invention is also applicable to a magnetic bearing rotary machine such as a blower for a laser device and a magnetic levitation machine such as a vibration removal board.

A variety of embodiment and variations have been described above, but the present invention is not limited to these contents. Other aspects conceivable within the scope of the technical idea of the present invention are also included in the scope of the present invention.

What is claimed is:

1. A magnetic bearing control device configured to detect, by a sensor, excitation current supplied from an excitation amplifier to a magnetic bearing configured to magnetically levitate a rotor, thereby generating a voltage equivalent signal for PWM control of the excitation amplifier based on a current setting signal based on a deviation of a rotor levitation position with respect to a target levitation position, and an excitation current detection signal of the sensor, wherein
the voltage equivalent signal is generated based on the current setting signal and a current deviation signal as a difference between the current setting signal and the excitation current detection signal.

2. The magnetic bearing control device according to claim 1, wherein
the voltage equivalent signal is a signal obtained by mixing and addition of
a first voltage equivalent signal generated in such a manner that a signal obtained by multiplication of the current deviation signal by a constant first gain value passes through a current controller including an integrator configured to output a time integral value and a proportional gain unit configured to output a proportional multiplication value, and
a second voltage equivalent signal generated in such a manner that the current setting signal passes through a transfer function section set to cancel out a transfer function including an electric constant of an electromagnet of the magnetic bearing.

3. The magnetic bearing control device according to claim 1, wherein
the current setting signal and a signal generated in such a manner that a signal obtained by multiplication of the current deviation signal by a constant first gain value passes through an integrator configured to output a time integral value are added and mixed together, and
the voltage equivalent signal is generated in such a manner that the added and mixed signal passes through a transfer function section set to cancel out a transfer function including an electric constant of an electromagnet of the magnetic bearing.

4. The magnetic bearing control device according to claim 2, wherein
instead of the current setting signal, a signal obtained by multiplication of the current setting signal by a constant second gain value of 0.5 to 1 is used.

5. The magnetic bearing control device according to claim 2, wherein
the current deviation signal is calculated as a difference between a signal obtained by multiplication of the current setting signal by a predetermined third gain value and a signal obtained by multiplication of the excitation current detection signal by the third gain value, and
the first gain value is set to equal to or more than 10 times greater than the third gain value and equal to or less than 1000 times greater than the third gain value.

6. The magnetic bearing control device according to claim 2, wherein
a transfer function of the transfer function section includes an inductance equivalent value and a resistance equivalent value set based on the electric constant of the electromagnet,
the inductance equivalent value is set to equal to or more than 0.1 times greater than an inductance of the electromagnet and equal to or less than 10 times greater than the inductance of the electromagnet,
the resistance equivalent value is set to equal to or more than 0.1 times greater than a resistance of the electromagnet and equal to or less than 10 times greater than the resistance of the electromagnet, and a ratio (Inductance Equivalent Value)/(Resistance Equivalent Value) of the inductance equivalent value to the resistance equivalent value is set to equal to or more than 0.1 times greater than a ratio (Inductance)/(Resistance) of the inductance to the resistance and equal to or less than 10 times greater than the ratio (Inductance)/(Resistance).

7. The magnetic bearing control device according to claim 3, wherein instead of the current setting signal, a signal obtained by multiplication of the current setting signal by a constant second gain value of 0.5 to 1 is used.

8. The magnetic bearing control device according to claim 3, wherein the current deviation signal is calculated as a difference between a signal obtained by multiplication of the current setting signal by a predetermined third gain value and a signal obtained by multiplication of the excitation current detection signal by the third gain value, and the first gain value is set to equal to or more than 10 times greater than the third gain value and equal to or less than 1000 times greater than the third gain value.

9. The magnetic bearing control device according to claim 3, wherein a transfer function of the transfer function section includes an inductance equivalent value and a resistance equivalent value set based on the electric constant of the electromagnet, the inductance equivalent value is set to equal to or more than 0.1 times greater than an inductance of the electromagnet and equal to or less than 10 times greater than the inductance of the electromagnet, the resistance equivalent value is set to equal to or more than 0.1 times greater than a resistance of the electromagnet and equal to or less than 10 times greater than the resistance of the electromagnet, and a ratio (Inductance Equivalent Value)/(Resistance Equivalent Value) of the inductance equivalent value to the resistance equivalent value is set to equal to or more than 0.1 times greater than a ratio (Inductance)/(Resistance) of the inductance to the resistance and equal to or less than 10 times greater than the ratio (Inductance)/(Resistance).

10. A vacuum pump comprising:

a magnetic bearing configured to magnetically levitate and support a pump rotor;

a motor configured to rotatably drive the pump rotor; and the magnetic bearing control device according to any one of claim 1 configured to control the magnetic baring.

* * * * *